(12) United States Patent
Scheuerman et al.

(10) Patent No.: US 8,177,206 B2
(45) Date of Patent: May 15, 2012

(54) CLAMP CONFIGURED FOR COMPRESSING A SECTION OF A BATTERY MODULE

(75) Inventors: Robert J. Scheuerman, Washington, MI (US); Rick F. Rourke, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 407 days.

(21) Appl. No.: 12/474,638

(22) Filed: May 29, 2009

(65) Prior Publication Data

US 2010/0299888 A1 Dec. 2, 2010

(51) Int. Cl.
*B25B 5/16* (2006.01)
(52) U.S. Cl. .............................. 269/43; 269/95; 29/270
(58) Field of Classification Search .................... 269/43, 269/3, 6, 71, 95, 166; 29/255, 270–278
See application file for complete search history.

(56) References Cited

U.S. PATENT DOCUMENTS

| 5,941,513 | A | * | 8/1999 | Moilanen et al. | 269/32 |
| 6,152,435 | A | * | 11/2000 | Snell | 269/43 |
| 6,196,536 | B1 | * | 3/2001 | Hintze | 269/282 |
| 6,237,906 | B1 | * | 5/2001 | Deans et al. | 269/43 |
| 2010/0299888 | A1 | * | 12/2010 | Scheuerman et al. | 24/457 |

* cited by examiner

*Primary Examiner* — Lee D Wilson
(74) *Attorney, Agent, or Firm* — Quinn Law Group, PLLC

(57) ABSTRACT

A clamp is configured for compressing a section of a battery module. The clamp includes a body, an arm, a first jaw, and a second jaw. The first jaw is operatively connected to the body. The arm is operatively connected to the body. The second jaw is operatively connected to the arm. Each jaw is configured to engage opposing ends of the battery module. The arm is slidably attached to the body to allow linear movement of the arm relative to the body along an axis. The second jaw moves with the arm a clamping distance between an extended position, for releasing the section of the battery module, and a compressed position, for holding the section of the battery module in compression between the jaws.

11 Claims, 3 Drawing Sheets

CLAMP CONFIGURED FOR COMPRESSING A SECTION OF A BATTERY MODULE

TECHNICAL FIELD

The present invention relates to a clamp that is configured for compressing a section of a battery module.

BACKGROUND OF THE INVENTION

A typical battery module includes a plurality of sections disposed in adjacent relationship to one another. Each section includes a plurality of cells disposed in adjacent relationship to one another. When the battery module is fully assembled, each of the cells of each section is held in compression by a plurality of rods that extend through all of the sections. If one or more of the cells within a single section stops working and the rods are removed to replace the cells, compression between the cells is lost and the entire battery module needs to be replaced.

SUMMARY OF THE INVENTION

A clamp is configured for compressing a section of a battery module. The clamp includes a body, an arm, a first jaw, and a second jaw. The first jaw is operatively connected to the body. The arm is operatively connected to the body. The second jaw is operatively connected to the arm. Each jaw is configured to engage an opposing end of the battery module. The arm is slidably attached to the body to allow linear movement of the arm relative to the body along an axis. The second jaw moves with the arm a clamping distance between an extended position, for releasing the section of the battery module, and a compressed position, for holding the section of the battery module in compression between the jaws.

Another aspect of the invention includes a method of operating a clamp to compress a section of a battery module to a desired compression load. The method includes aligning a pair of opposing jaws of a clamp with opposing ends of the section of the battery module when the clamp is in an extended position. The opposing jaws of the clamp are moved from an extended position to a compressed position such that the opposing jaws move linearly toward one another along an axis to hold the section of the battery module in compression to the desired compression load.

Yet another aspect of the invention includes a method of preparing a battery module to remove one of a plurality of sections of a battery module. The method includes providing a pair of clamps that correspond to a pair of corresponding sides for each of the plurality of sections. A pair of opposing jaws of each clamp is aligned with opposing ends of one of the sides of the respective section of the battery module when the clamp is in an extended position. The opposing jaws of each of the clamps are moved from the extended position to a compressed position such that the opposing jaws move linearly toward one another along an axis to hold the side of the respective section of the battery module in compression to a desired compression load. At least one rod that extends through each of the plurality of sections to opposing ends of the battery module is removed such that the compression load of each of the plurality of sections is maintained by the respective pair of clamps in the compressed position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

FIG. 3 is a schematic front perspective view of the clamp of FIG. 1 in an extended position;

DESCRIPTION OF THE PREFERRED EMBODIMENTS

Figure 4:
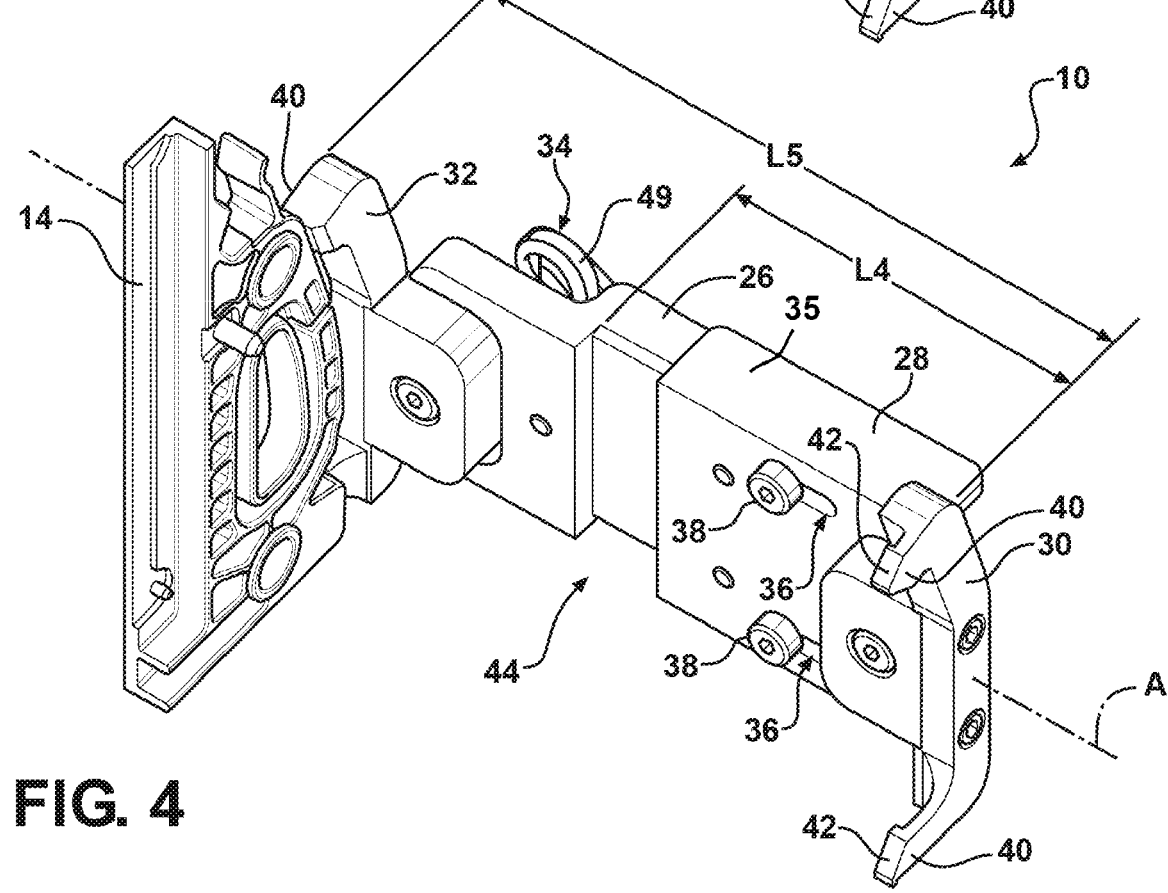
FIG. 4 is a schematic rear perspective view of the clamp of FIG. 1 in the extended position.
Figure 5:
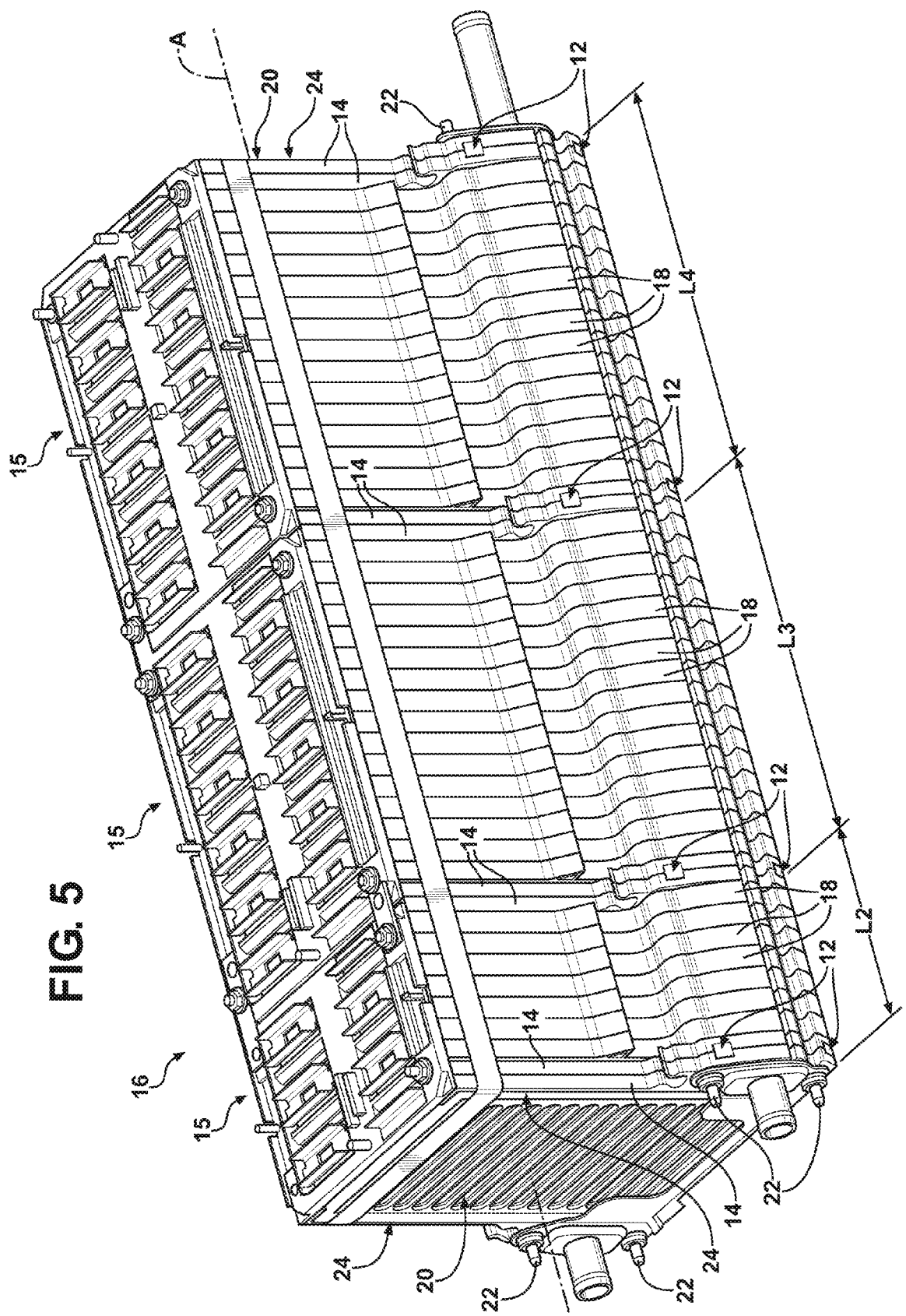
FIG. 5 is schematic top perspective view of the battery module having a plurality of sections.

Referring to the drawings, wherein like reference numbers refer to like components, FIGS. 1-4 show a clamp 10 that is configured for compressing and holding a section 15 of a battery module 16, shown in FIG. 5, at a desired compression load. The clamp 10 is configured to engage detents 12 defined in end frames 14 of the section 15 of the battery module 16, as will be described in more detail below.

Referring to FIG. 5, the battery module 16 includes one or more sections 15. In the embodiment shown, there are three sections 15 in the battery module 16. It should be appreciated that more or less sections 15 may be used for the battery module 16 as known to those skilled in the art. Each section 15 includes a pair of end frames 14 and a plurality of cells 18. One of the end frames 14 is disposed at opposing ends of each section 15 and the cells 18 are disposed between each pair of end frames 14. The sections 15 are aligned and abutted with one another such that one of the end frames 14 of one section 15 abuts one of the end frames 14 of the adjacent section 15. Therefore, there is also a single end frame 14 disposed at the opposing ends 20 of the battery module 16. In the embodiment shown in the Figures, each end frame 14 defines two pair of the detents 12. Referring to FIG. 5, a distance L1, L2, L3 is defined between the detents 12 at opposing ends of the respective section 15. The distances L1, L2, L3 are determined by the total number of cells 18 disposed within the respective section 15. It should be appreciated that if each section 15 includes an equal number of cells 18, then the distances L1, L2, L3 will be equal to one another. A plurality of rods 22 each extends between the opposing ends 20 of the battery module 16 such that the rods 22 extend through each of the end frames 14 and each of the battery cells 18. Each pair of the detents 12 is disposed on opposing sides 24 of the end frame 14 from one another. A pair of rods 22 each extends through opposing sides 24 of the battery module 16. Each rod 22 is fastened or otherwise secured to hold the entire battery module 16 in compression between the ends at the desired compression load. This means that each of the cells 18 for each of the sections 15 is held in compression relative to one another.

Figure 1:
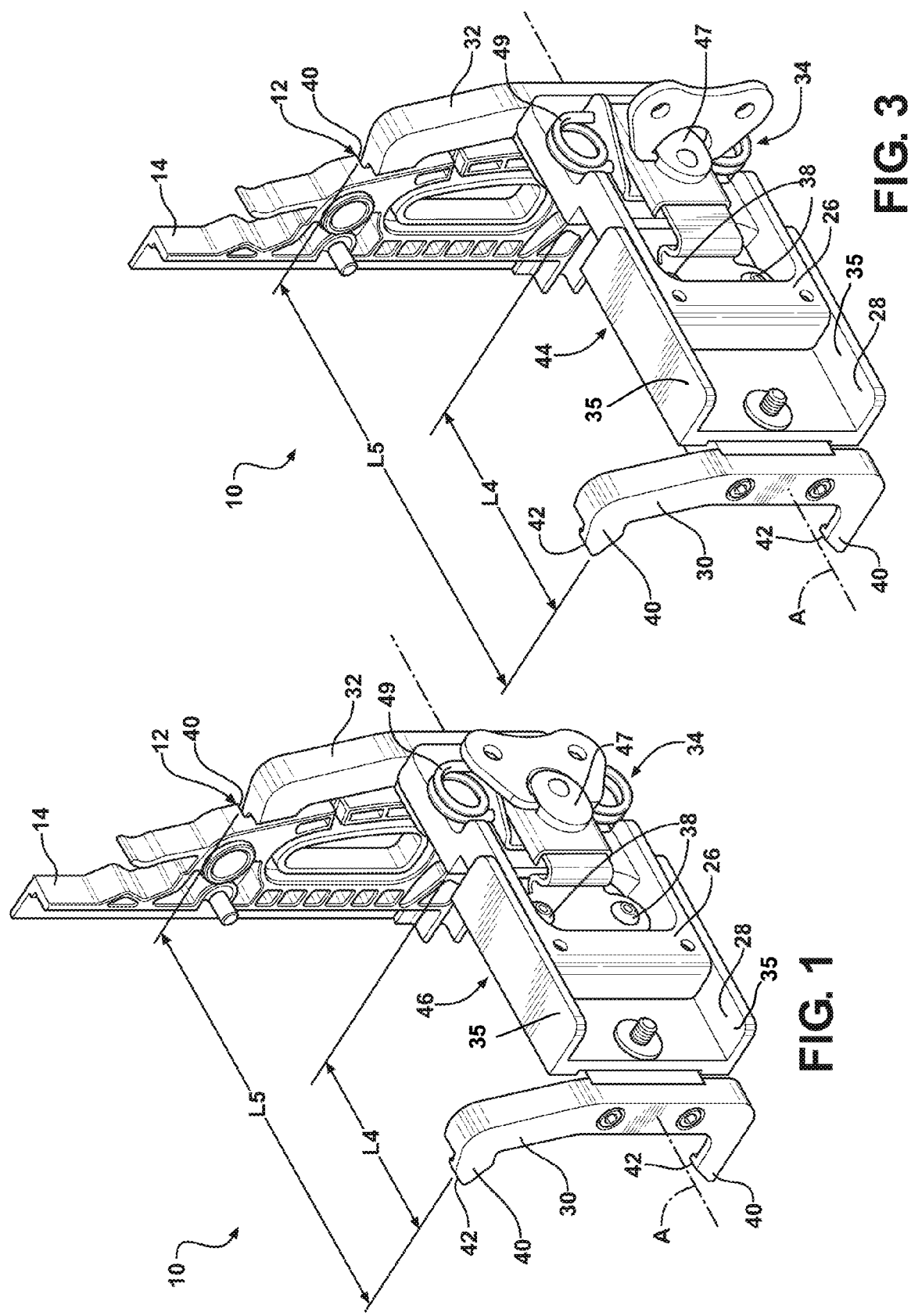
FIG. 1 is a schematic front perspective view of a clamp in a compressed position for engaging end frames of a section of a battery module.
Figure 2:
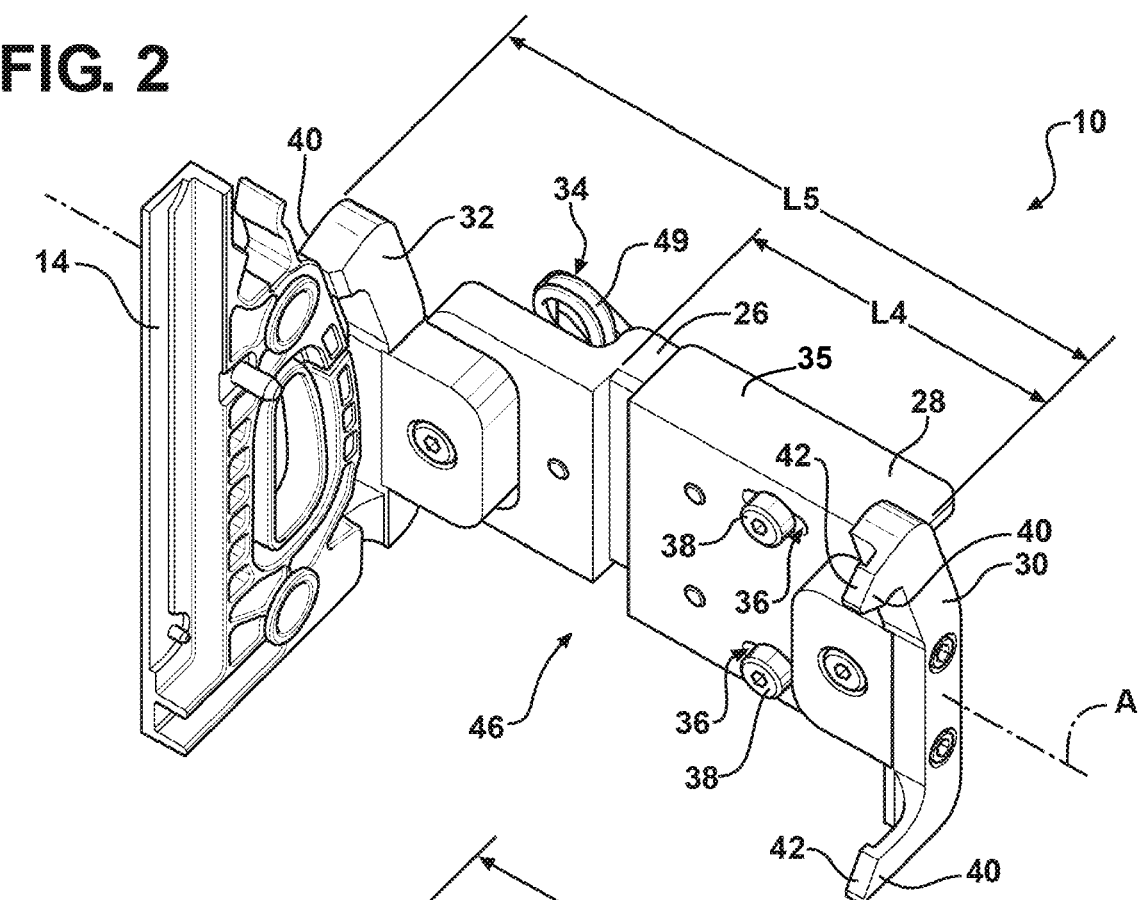
FIG. 2 is a schematic rear perspective view of the clamp of FIG. 1 in the compressed position.

Referring to FIGS. 1-4, the clamp 10 includes a body 26, an arm 28, first jaw 30, a second jaw 32, and a clamping mechanism 34. The arm 28 is operatively connected to the body 26. More specifically, the arm 28 extends a linear length L4 and is slidably attached to the body 26 to allow linear movement of the arm 28 relative to the body 26 along an axis A. The body 26 includes a pair of flanges 35 extending in spaced and parallel relationship to one another and the arm 28 is slidably disposed between the flanges 35. Referring to FIGS. 2 and 4, the arm 28 defines a pair of slots 36. A pin 38 extends through each of the slots 36 and into the body such that the arm 28 slides relative to the body 26 along the axis A. Therefore, the pin 38 not only facilitates linear movement along the axis A, but also retains the arm 28 to the body 26. It should be appreciated, however, that the slots 36 may alternatively be defined in the body 26 such that the pins 38 extend through the arm 28 and the arm 28 slides relative to the body 26 along the axis A. The first jaw 30 is operatively connected to the body 26 and the second jaw 32 is operatively connected to the arm 28 such that the jaws 30, 32 move linearly along the axis A relative to one another. The jaws 30, 32 are disposed to be in spaced relationship to one another. Each of the jaws 30, 32 are generally C-shaped. Each jaw 30, 32 includes a base portion 39 having at least one finger 40 that is configured for disposition within one of the detents 12 in the corresponding end frame 14. The base portion 39 and fingers 40 of the second jaw 32 extend in spaced and generally parallel relationship to the base portion 39 and fingers 40 of the first jaw 30. Referring to the embodiments shown in FIGS. 1 and 2, each jaw 30, 32 includes a pair of fingers 40 that extend in spaced and generally parallel relationship to one another. It should be appreciated that more or less fingers 40 may be used as known to those skilled in the art. Each finger 40 includes a projection 42 that is configured for engaging the respective detent 12 in the corresponding end frame 14. Each projection 42 extends generally perpendicularly from the respective finger 40. It should be appreciated that the projections 42 may be any shape known to those skilled in the art that engages the respective detent 12. The jaws 30, 32 may be formed from steel, such as hardened tool steel, or any other suitable material known to those skilled in the art.

Referring again to FIGS. 1 and 3, the clamping mechanism 34 operatively interconnects the body 26 and the arm 28. The clamping mechanism 34 is configured to selectively allow the arm 28 to move relative to the body 26 between an extended position 44, as shown in FIGS. 3 and 4, and a compressed position 46, as shown in FIGS. 1 and 2. The clamping mechanism 34 is actuated to lock and hold the clamp 10 in the compressed position 46. The clamping mechanism 34 may include a toggle clamp 47 and a torsion spring 49. It should be appreciated that the clamping mechanism 34 may be any other device and/or spring known to those skilled in the art. When the clamp 10 is in the extended position 44, as shown in FIGS. 3 and 4, the toggle clamp 47 is unlatched such that the second jaw 32 and the arm 28 are moved linearly away from the first jaw 30 and the body 26. The extended position 44 allows the clamp 10 to be presented to or released from the respective opposing end frames 14 of the respective section 15. When the clamp 10 is presented to the respective section 15 and the projection 42 of each finger 40 is aligned with the respective detent 12, the clamping mechanism 34 is moved to the compressed position 46, as shown in FIGS. 1 and 2. When the clamp 10 is in the compressed position 46, the toggle clamp 47 is latched such that the second jaw 32 is moved linearly toward the first jaw 30 and the body 26, preferably with the projections 42 of each finger 40 engaged within the respective detent 12. A clamping distance L5 is defined between the fingers 40 of the second jaw 32 and the fingers 40 of the first jaw 30 when the clamp 10 is in the compressed position 46. The clamping distance L5 may be equal to any distance L1, L2, L3 of a respective section 15. When the clamp 10 is in the compressed position 46, the clamp 10 holds the respective section 15 in compression to match the compression load provided by the rods 22. Referring again to FIG. 3, a clamp 10 is preferably secured to each side of the respective section 15. It should be appreciated that the L5 of the clamps 10 shown in FIGS. 2 and 3 may be configured to equal the desired distance L1, L2, L3 by varying the linear length L4 of the arm 28.

To disassemble the battery module 16 shown in FIG. 5, while holding each section 15 in compression, six clamps 10 are attached to the respective sides 24 of the respective sections 15. Each clamp 10 is moved to the compressed position 46 and the cells 18 of each section 15 are held in compression. Each rod 22 is then removed from the battery module 16. Once the rods 22 are removed, any desired section 15 of the battery module 16 is removed and either replaced or repaired without upsetting the compression load of the remaining sections 15. After the desired section 15 is repaired or replaced, that section 15 is replaced and abutted with the remaining sections 15. The rods 22 are then reinserted between the ends and refastened to match the desired compression load. All of the clamps 10 are then moved to the extended position 44 and removed from the respective sections 15.

While the best modes for carrying out the invention have been described in detail, those familiar with the art to which this invention relates will recognize various alternative designs and embodiments for practicing the invention within the scope of the appended claims.

The invention claimed is:

1. A clamp configured for compressing a section of a battery module, said clamp comprising:
 a body;
 a first jaw operatively connected to said body;
 an arm operatively connected to said body;
 a second jaw operatively connected to said arm;
 wherein each of said jaws are configured for engaging opposing ends of the section of the battery module;
 wherein said arm is slidably attached to said body to allow linear movement of said arm relative to said body along an axis;
 wherein said second jaw moves with said arm a clamping distance between an extended position, for releasing the section of the battery module, and a compressed position, for holding the section of the battery module in compression between said jaws;
 a clamping mechanism operatively interconnecting said body and said arm;
 wherein said clamping mechanism is configured to actuate and selectively allow said arm to move relative to said body between said extended position and said compressed position.

2. A clamp, as set forth in claim 1, wherein said arm defines at least one slot and a pin extending through said at least one slot and into said body;
 wherein said at least one slot and said pin are configured to allow said arm and said second jaw to only move said clamping distance.

3. A clamp, as set forth in claim 2, wherein said pin is configured for retaining said arm to said body.

4. A clamp, as set forth in claim 1, wherein said body includes a pair of flanges extending in spaced and parallel relationship to one another and said arm is slidably disposed between said pair of flanges.

5. A clamp, as set forth in claim 1, wherein each of said jaws includes a base portion and at least one finger that is configured for disposition within a respective detent defined in the opposing ends of the section of the battery module.

6. A clamp, as set forth in claim 5, wherein each of said jaws includes a base portion and a pair of fingers extending in spaced and generally parallel relationship to one another from said respective base portion.

7. A clamp, as set forth in claim 6, wherein each of said fingers includes a projection configured for engaging the respective detent in the corresponding end of the section.

8. A clamp, as set forth in claim 7, wherein each of said projections extends from said respective finger in spaced and generally parallel relationship to one another.

9. A clamp, as set forth in claim 5, wherein each of said jaws is generally C-shaped.

10. A clamp, as set forth in claim 1, wherein said clamping mechanism includes a toggle clamp operatively interconnecting said body and said arm.

11. A clamp, as set forth in claim 10, wherein said clamping mechanism further includes a torsion spring.

* * * * *